United States Patent
Seo et al.

(10) Patent No.: US 10,271,059 B2
(45) Date of Patent: Apr. 23, 2019

(54) DECODER, DECODING SYSTEM INCLUDING THE DECODER AND METHOD OF OPERATING THE DECODER

(71) Applicant: SAMSUNG ELECTRONICS CO., LTD., Suwon-si, Gyeonggi-do (KR)

(72) Inventors: Young Il Seo, Seoul (KR); Hyuk Jae Jang, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 248 days.

(21) Appl. No.: 14/942,251

(22) Filed: Nov. 16, 2015

(65) Prior Publication Data

US 2016/0150244 A1     May 26, 2016

(30) Foreign Application Priority Data

Nov. 21, 2014    (KR) ........................ 10-2014-0163739

(51) Int. Cl.
*H04N 19/44*        (2014.01)
*H04N 19/423*      (2014.01)
*H04N 19/43*       (2014.01)

(52) U.S. Cl.
CPC .......... *H04N 19/44* (2014.11); *H04N 19/423* (2014.11); *H04N 19/43* (2014.11)

(58) Field of Classification Search
None
See application file for complete search history.

(56) References Cited

U.S. PATENT DOCUMENTS

| | | | | |
|---|---|---|---|---|
| 4,349,846 A | * | 9/1982 | Sekigawa | ............ H04N 1/4051 |
| | | | | 348/409.1 |
| 4,533,958 A | * | 8/1985 | Herget | ............... H04N 1/40068 |
| | | | | 341/87 |
| 4,596,039 A | * | 6/1986 | Mitchell | ................ H04N 1/419 |
| | | | | 341/106 |
| 4,613,901 A | * | 9/1986 | Gilhousen | ............ H04N 7/1675 |
| | | | | 348/E7.056 |

(Continued)

FOREIGN PATENT DOCUMENTS

| | | |
|---|---|---|
| JP | 2007-266749 A | 10/2007 |
| JP | 2009-017509 A | 1/2009 |

(Continued)

*Primary Examiner* — Jayanti K Patel
*Assistant Examiner* — Shadan E Haghani
(74) *Attorney, Agent, or Firm* — Lee & Morse, P.C.

(57) ABSTRACT

A decoder includes a parser, an intra predictor, and an inter predictor. The parser parses a bit stream to extract header information and first through third data information, to determine a prediction mode for blocks in a current frame based on the header information, and to selectively output the first and second data information based on the prediction mode. The intra predictor generates a predicted value of a pixel of a current block based on a pixel value of a first reference block in the current frame based on the first data information. The inter predictor predicts a second reference block from a reference frame based on the second data information, converts a pixel value of the second reference block, and generates a predicted value of the pixel of the current block based on a converted pixel value.

18 Claims, 8 Drawing Sheets

(56) References Cited

U.S. PATENT DOCUMENTS

| | | | |
|---|---|---|---|
| 4,651,293 A * | 3/1987 | Kato | H04N 1/40075 358/3.14 |
| 4,677,619 A * | 6/1987 | Kawai | G01R 23/15 714/706 |
| 4,965,825 A * | 10/1990 | Harvey | G01R 1/071 380/233 |
| 5,818,532 A * | 10/1998 | Malladi | H04N 19/00 375/240.03 |
| 6,081,295 A | 6/2000 | Adolph et al. | |
| 7,486,731 B2 | 2/2009 | Cotton et al. | |
| 7,518,534 B2 | 4/2009 | Grivna | |
| 7,860,168 B2 | 12/2010 | Winger | |
| 8,194,748 B2 | 6/2012 | Kim | |
| 8,265,163 B2 * | 9/2012 | Danielsen | H04N 19/563 375/240.08 |
| 8,406,291 B2 | 3/2013 | Kim et al. | |
| 8,606,028 B2 | 12/2013 | Noda et al. | |
| 2004/0010633 A1 * | 1/2004 | Ishikawa | H04N 1/4052 710/1 |
| 2009/0129685 A1 * | 5/2009 | Miyasaka | G09G 5/00 382/232 |
| 2010/0046612 A1 | 2/2010 | Sun et al. | |
| 2010/0134496 A1 * | 6/2010 | Bhaskaran | G06T 3/403 345/428 |
| 2011/0135218 A1 * | 6/2011 | Moore | H04N 5/357 382/275 |
| 2011/0262037 A1 * | 10/2011 | Ohnishi | H04N 19/61 382/166 |
| 2013/0177081 A1 * | 7/2013 | Chen | H04N 19/80 375/240.16 |
| 2014/0301448 A1 * | 10/2014 | Flynn | H04N 19/30 375/240.03 |
| 2015/0103916 A1 * | 4/2015 | Gisquet | H04N 19/56 375/240.16 |

FOREIGN PATENT DOCUMENTS

| | | |
|---|---|---|
| JP | 2009-171180 A | 7/2009 |
| JP | 2012-054750 A | 3/2012 |

* cited by examiner

DECODER, DECODING SYSTEM INCLUDING THE DECODER AND METHOD OF OPERATING THE DECODER

CROSS-REFERENCE TO RELATED APPLICATION

Korean Patent Application No. 10-2014-0163739, filed on Nov. 21, 2014, and entitled, "Decoder, Decoding System Including the Decoder and Method of Operating the Decoder," is incorporated by reference herein in its entirety.

BACKGROUND

1. Field

One or more embodiments described herein relate to a decoder, a decoding system including a decoder, and a method of operating a decoder.

2. Description of the Related Art

Video signal transmission usually involves performing a number of operations. For example, raw data may be compressed and encoded before being streamed to a receiver. In order to play the encoded data, the receiver decodes the encoded data. When the encoded data is at least nine bits in length and the receiver decodes the encoded data using an 8-bit reference frame, picture quality of the video signal may deteriorate as a result of bit errors.

SUMMARY

In accordance with one or more embodiments, a decoder includes a parser to parse a bit stream to extract header information and first through third data information, to determine a prediction mode for a plurality of blocks in a current frame based on the header information, and to selectively output the first data information and the second data information according to the prediction mode; an intra predictor to generate a predicted value of a pixel of a current block based on a pixel value of a first reference block in the current frame based on the first data information; and an inter predictor to predict a second reference block from a reference frame based on the second data information, to convert a pixel value of the second reference block, and to generate a predicted value of the pixel of the current block based on a converted pixel value.

The inter predictor may include a bit converter to convert the pixel value of the second reference block to the converted pixel value having a same number of bits as a pixel value of the current block; and a motion compensator to generate the predicted value based on the converted pixel value. The bit converter may calculate a pixel value having a first number of bits using a predetermined matrix, the first number of bits may correspond to a difference between a number of bits of the pixel value of the second reference block and the number of bits of the pixel value of the current block.

The predetermined matrix may be a 2×2 matrix, and elements of the matrix may be medium values or random values of binary numbers having a number of digits corresponding to the first number of bits. The bit converter may calculate a value of the first number of bits, and add the value to a least significant bit of the pixel value of the reference block to convert the pixel value of the reference block to the converted pixel value having the same number of bits as the pixel value of the current block.

The bit converter may calculate the value of the first number of bits using the 2×2 matrix corresponding to a combination of the medium values or a combination of the random values, elements in a first row of the matrix may be alternately added to a least significant bit of each of pixels in each of odd-numbered lines of the reference block, and elements in a second row of the matrix may be alternately added to a least significant bit of each of pixels in each of even-numbered lines of the reference block.

The predetermined matrix may be an n×n matrix, where "n" is an integer of at least 3, and elements of the matrix may be random values of binary numbers having a number of digits corresponding to the first number of bits. The bit converter may calculate the value of the first number of bits using the n×n matrix corresponding to a combination of the random values, and elements in first through n-th rows of the matrix may be alternately added to a least significant bit of each of pixels in each of lines of the reference block.

The decoder may include an adder to add a residual value restored by converting a predetermined value included in the third data information and the predicted value output from either the intra predictor or the inter predictor and to output a decoded stream; and memory access logic to output only data to be displayed among data corresponding to the decoded stream. The memory access logic may remove least significant bits from a number of bits corresponding to the decoded stream, except for a number of bits to be displayed by a display device.

In accordance with one or more other embodiments, a method for operating a decoder includes parsing a bit stream to extract header information, first data information, and second data information; selectively outputting the first data information and the second data information according to a prediction mode determined for each of a plurality of blocks in a current frame based on the header information; generating a predicted value of a pixel of a current block using a pixel value of a first reference block in the current frame based on the first data information; predicting a second reference block from a reference frame based on the second data information and converting a pixel value of the second reference block to a converted pixel value having a same number of bits as a pixel value of the current block; and generating a predicted value of the pixel of the current block based on the converted pixel value. The pixel value of the second reference block may have fewer bits than the pixel value of the current block.

The method may include calculating a binary number having a number of digits corresponding to a first number of bits using a predetermined matrix, the first number of bits corresponding to a difference between a number of bits of the pixel value of the second reference block and the number of bits of the pixel value of the current block. The method may include calculating a value of the first number of bits based on a 2×2 matrix, the value of the first number of bits calculated based on a combination of medium values for the first number of bits or based on a 2×2 matrix or n×n matrix using a combination of random values for the first number of bits, where "n" is an integer of at least 3. The method may include adding the value of the first number of bits to the pixel value of the second reference block next to a least significant bit.

In accordance with one or more other embodiments, a decoding system includes a decoder to decode a bit stream and output a decoded stream; and a memory buffer to receive the decoded stream and store the decoded stream as a reference frame, wherein the decoder includes: a parser to parse the bit stream to extract header information, first data information, and second data information, to determine a prediction mode for a plurality of blocks in a current frame based on the header information, and to selectively output the first data information and the second data information according to the prediction mode; an intra predictor to generate a predicted value of a pixel of a current block using a pixel value of a first reference block in the current frame based on the first data information; and an inter predictor to predict a second reference block from a reference frame based on the second data information, to convert a pixel value of the second reference block, and to generate a predicted value of the pixel of the current block based on a converted pixel value.

The inter predictor may include a bit converter to convert the pixel value of the second reference block to the converted pixel value having a same number of bits as a pixel value of the current block; and a motion compensator to generate the predicted value based on the converted pixel value. The bit converter may calculate a pixel value having a first number of bits using a predetermined matrix, the first number of bits corresponding to a difference between a number of bits of the pixel value of the second reference block and the number of bits of the pixel value of the current block.

In accordance with one or more other embodiments, a decoder includes first logic to extract header information and data information from a bit stream, to determine a prediction mode for a plurality of blocks in a current frame based on the header information, and to selectively output at least a portion of the data information based on the prediction mode; second logic to generate a predicted value of a pixel of a current block based on a pixel value of a first reference block in the current frame based on the data information; and third logic to predict a second reference block from a reference frame based on the data information, to convert a pixel value of the second reference block, and to generate a predicted value of the pixel of the current block based on a converted pixel value.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
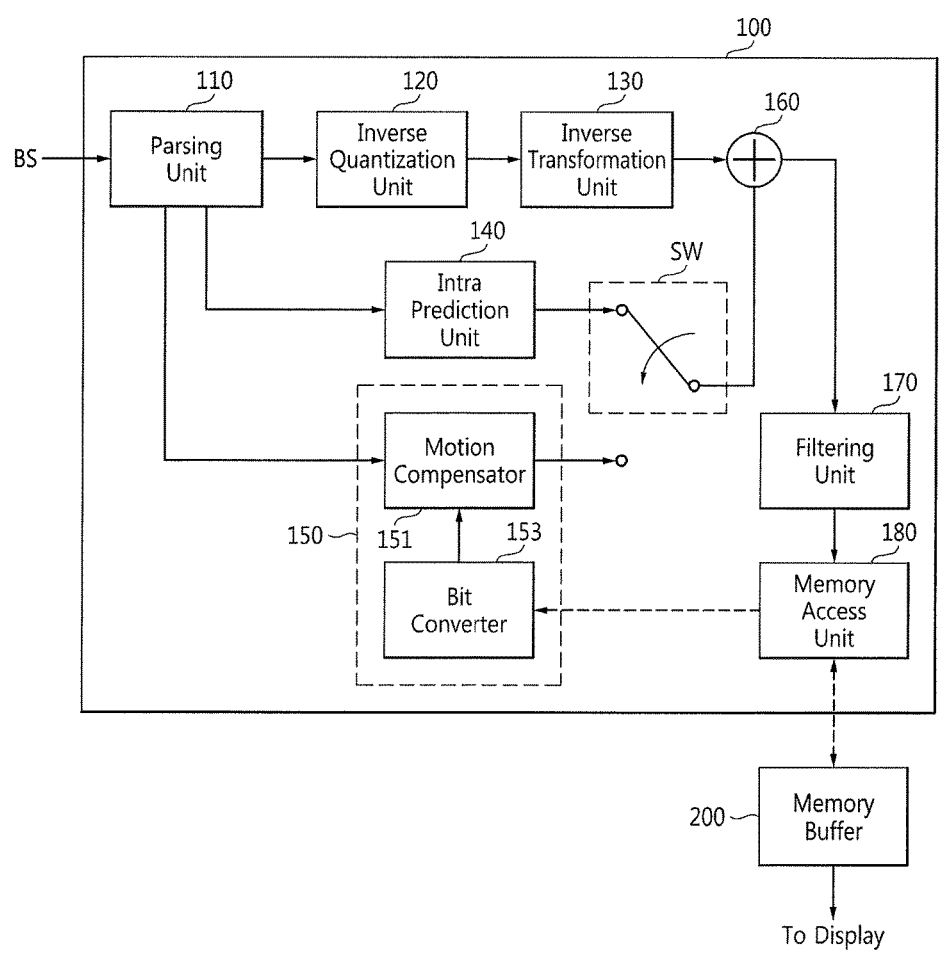
FIG. 1 illustrates an embodiment of a decoder.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments may be combined to form additional embodiments.

It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Figure 2:
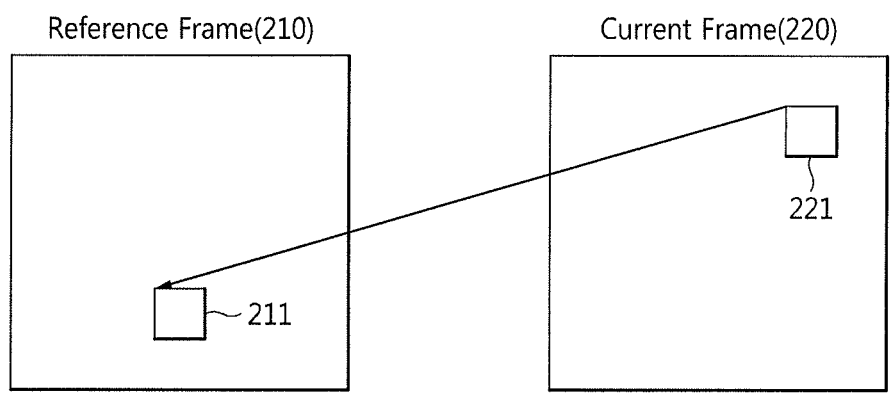
FIG. 2 illustrates an example of the operation of an inter prediction unit.
Figure 3:
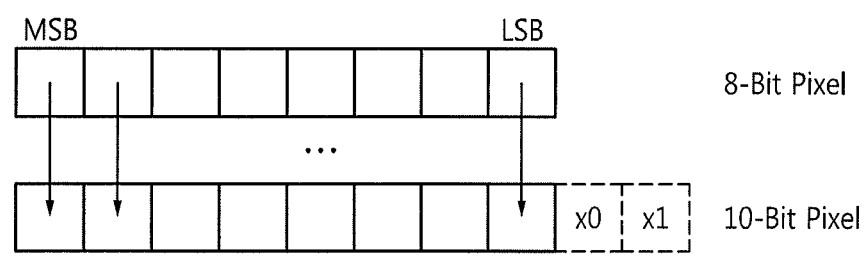
FIGS. 3 and 4 illustrate examples of the operation of a bit converter.
Figure 4:
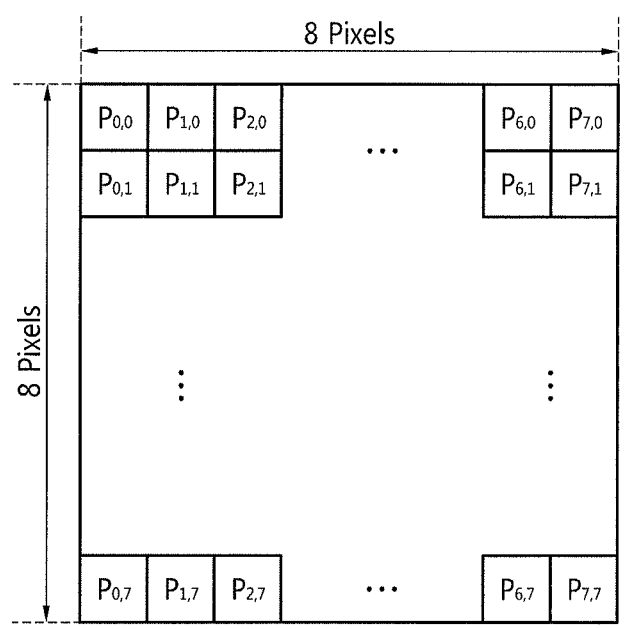

FIG. 1 illustrates an embodiment of a decoder 100, FIG. 2 illustrates an example of the operation of an inter prediction unit 150 in FIG. 1, and FIGS. 3 and 4 illustrate examples for explaining the operation of a bit converter 153 in FIG. 1.

Referring to FIG. 1, the decoder 100 restores an original video signal from a bit stream BS which is a compressed signal in a digital format and/or processes the bit stream BS. The bit stream BS includes data that has been encoded in a compression format (e.g., MPEG, WMV, DivX, or H.264). The encoded data may be sequentially transmitted bit by bit. The bit stream BS may be received from an encoder or another source such as the memory of a smart phone or an image server connected through a digital network. The bit stream BS may include a plurality of frames and other information. A frame may refer to a single still image.

The decoder 100 decodes a single frame in units of blocks of a predetermined size. For instance, the decoder 100 may decode a frame in units of blocks having a size of 8*8, 16*16 pixels, 32*32, or another size.

The decoder 100 includes a parsing unit 110, an inverse quantization unit 120, an inverse transformation unit 130, an intra prediction unit 140, an inter prediction unit 150, an adder 160, a filtering unit 170, and a memory access unit 180.

The parsing unit 110 parses the bit stream BS and extracts header information and data information from the bit stream BS. The header information may include information about all frames and information about blocks corresponding to each of the frames. The data information may include first data information corresponding to neighboring block information, second data information corresponding to a motion vector, and third data information corresponding to a predetermined value corresponding to each block. The motion vector indicates displacement of a reference block in a reference frame that has already been decoded from a current block. The predetermined value is a coefficient used to restore a residual value. The residual value indicates a difference between a pixel value of the reference block and a pixel value of the current block.

The parsing unit 110 may output neighboring block information to the intra prediction unit 140 based on information (e.g., prediction mode information) regarding each block or may output a motion vector to the inter prediction unit 150. A switch SW may be controlled according to an output of the parsing unit 110, so that an output of the intra prediction unit 140 or an output of the inter prediction unit 150 is connected to the adder 160.

The inverse quantization unit 120 inverse-quantizes a predetermined value output from the parsing unit 110. The inverse transformation unit 130 restores a residual value based on the inverse-quantized predetermined value.

The intra prediction unit 140 generates a predicted value of a pixel in a current block using a pixel value of a neighboring block that has already been decoded in a current frame based on neighboring block information. For instance, the intra prediction unit 140 may predict a pixel value of a current block from a pixel value of at least one adjacent block above, to the left of, to the upper left of, and/or to the upper right of the current block.

The inter prediction unit 150 predicts a reference block from a reference frame that has already been decoded based on a motion vector of a current block, and generates a predicted value of a pixel in the current block based on a converted pixel value of the reference block. For example, as shown in FIG. 2, the inter prediction unit 150 may predict a pixel value of a current block 221 in a current frame 220 from a pixel value of a reference block 211 in a reference frame 210.

The decoder 100 decodes and outputs a pixel value in units of a predetermined number of bits, e.g., 10 bits. For instance, when a pixel is expressed in a YUV format, each of a Y component representing luminance or luma and U and V components representing chrominance or chroma may be expressed as a 10-bit value. When a pixel is expressed in an RGB format, each of R, G and B components may be expressed as a 10-bit value.

However, a decoded stream may be input and output in units of a different number of (e.g., 8) bits, for example, for an external display device. For the input and output of the decoded stream in units of 8 bits, the inter prediction unit 150 may include a motion compensator 151 and a bit converter 153. Although the bit converter 153 is separated from the motion compensator 151 in the embodiment of FIG. 1, the bit converter 153 may be included in the motion compensator 151 in another embodiment.

The bit converter 153 converts a pixel value of a reference block output from the memory access unit 180 into as many bits as a pixel value of a current block and outputs a converted pixel value to the motion compensator 151. For example, the bit converter 153 may calculate a pixel value having an increased number of bits greater than the number of bits in a pixel value of a reference block using a predetermined matrix. The motion compensator 151 generates a predicted value of a pixel of a current block based on the converted pixel value of a reference block.

For instance, when a pixel of a reference block has an 8-bit value and a pixel of a current block has a 10-bit value as shown in FIG. 3, the bit converter 153 may calculate a 2-bit value (x0, x1) corresponding to a 2-bit difference based on Equation 1 or Equation 2:

$$(x0, x1) = f\begin{pmatrix} 0b01 & 0b10 \\ 0b10 & 0b01 \end{pmatrix} \text{ and} \qquad (1)$$

$$(x0, x1) = f\begin{pmatrix} 0b11 & 0b00 \\ 0b01 & 0b10 \end{pmatrix}. \qquad (2)$$

Elements of the matrix may be defined as a combination of medium values of 2-digit binary numbers as shown in Equation 1, or a combination of random values as shown in Equation 2. At this time, 2-digit binary values are "00", "01", "10", and "11" and the medium values of the 2-digit binary values are "01" and "10".

Thereafter, the bit converter 153 may add the 2-digit binary value (x0, x1) to the pixel value of the reference block next to a least significant bit (LSB) of the pixel value, thereby generating a 10-bit pixel value. To describe this operation in greater detail, it is assumed that the decoder 100 decodes a frame in units of blocks having a size of 8*8 pixels using a reference block having the same size.

When Equation 1 is used, the bit converter 153 may alternately add 2-bit values (x0, x1) of "01" and "10" in the first row to the bit values of respective pixels $P_{0,0}$ through $P_{7,0}$, thereby converting an 8-bit pixel value into a 10-bit pixel value. The bit converter 153 may also alternately add 2-bit values (x0, x1) of "10" and "01" in the second row to the bit values of respective pixels $P_{0,1}$ through $P_{7,1}$, thereby converting 8-bit pixel values into 10-bit pixel values. For instance, the bit converter 153 may add a 2-bit value of "10" to an 8-bit value of the pixel $P_{2,1}$ received from the memory access unit 180, thereby converting the 8-bit value into a 10-bit pixel value.

When Equation 2 is used, the bit converter 153 may alternately add 2-bit values (x0, x1) of "11" and "00" in the first row to the bit values of respective pixels $P_{0,0}$ through $P_{7,0}$, thereby converting an 8-bit pixel value into a 10-bit pixel value. The bit converter 153 may also alternately add 2-bit values (x0, x1) of "01" and "10" in the second row to the bit values of respective pixels $P_{0,1}$ through $P_{7,1}$, thereby converting 8-bit pixel values into 10-bit pixel values.

In another embodiment, the decoder 100 may perform decoding in units of "k" bits (where "k" is an integer of at least 9) of a pixel. In this case, the bit converter 153 may calculate (k−8)-bit values based on a 2×2 or n×n (where "n" is an integer of at least 3) matrix corresponding to a combination of medium values or random values of (k−8)-digit binary values corresponding to a difference between the number of bits of a reference pixel and the number of bits of a current pixel. The bit converter 153 may alternately add the calculated (k−8)-bit values to a pixel value of a reference block next to an LSB, thereby generating k-bit pixel values.

The bit converter 153 may calculate an additional bit value based on a 2×2 matrix when using the medium values and may calculate an additional hit value based on a 2×2 or n×n matrix when using random values. The bit converter 153 may calculate an additional bit value using a matrix set by a user or set by default in a device equipped with the decoder 100.

The adder 160 adds the restored residual value output from the inverse transformation unit 130 and the predicted value output from the intra prediction unit 140 or the inter prediction unit 150, to thereby generate a decoded stream. The filtering unit 170 may perform filtering on the decoded stream to increase picture quality. For instance, the filtering unit 170 may include a de-blocking filter for reducing block distortion and/or an adaptive loop filter for removing overall frame distortion. The stream that has been subjected to the filtering may be stored in the memory buffer 200 to be used as a reference frame or may be transmitted to a display device for reproducing images.

The memory access unit 180 output only data to be displayed to the memory buffer 200 among the filtered data output from the filtering unit 170. For example, to allow the decoded stream to be reproduced by an 8-bit based display device, the memory access unit 180 removes the LSBs from the decoded stream except for an 8-bit value and then outputs the decoded stream to the memory buffer 200.

In addition, the memory access unit 180 may receive data corresponding to an 8-bit reference frame from the memory buffer 200 and output the data to the bit converter 153. The memory buffer 200 may store a decoded stream output from the memory access unit 180 and may output a decoded stream that has been stored to the memory access unit 180.

Figure 5:
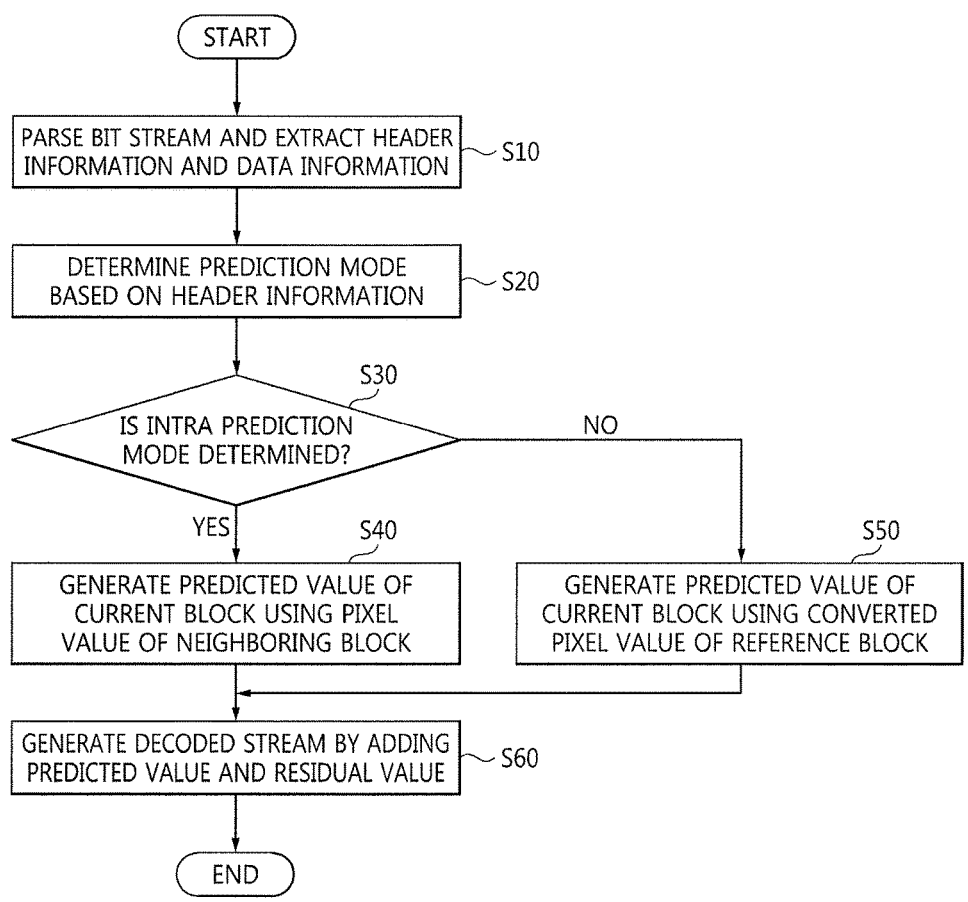
FIG. 5 illustrates an embodiment of a method for operating a decoder.
Figure 6:
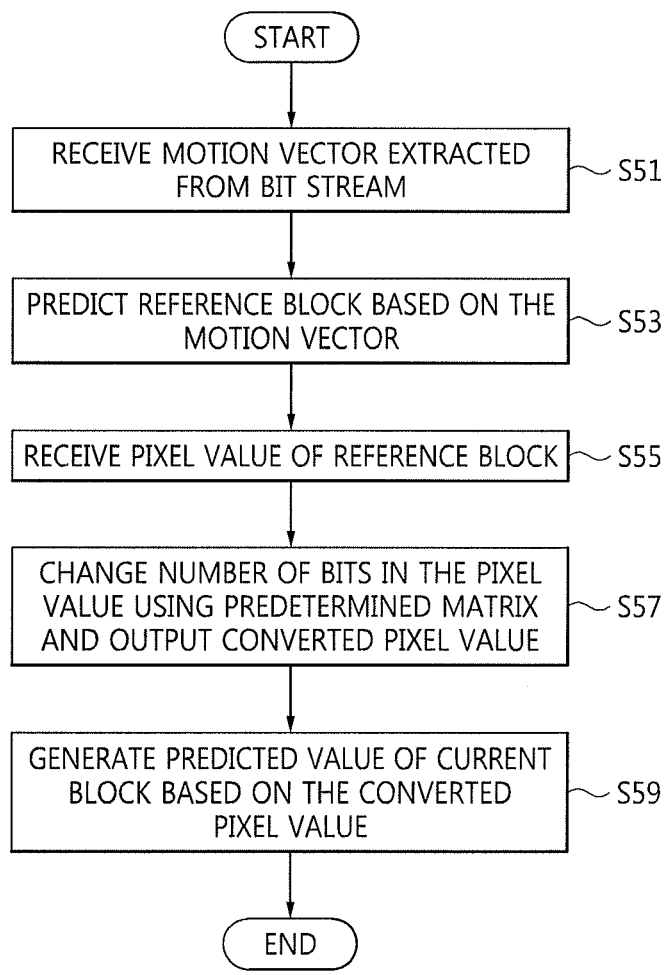
FIG. 6 illustrates operation of the inter prediction unit in this method.

FIG. 5 illustrates an embodiment of a method for operating the decoder 100 in FIG. 1, and FIG. 6 illustrates an embodiment of the operation of the inter prediction unit 150 in FIG. 5.

Referring to FIGS. 1 through 6, the parsing unit 110 parses the bit stream BS and extracts header information and first through third data information from the bit stream BS (operation S10) and determines a prediction mode based on the header information (operation S20). The parsing unit 110 determines whether a current block is to be predicted by the intra prediction unit 140 based on information about each of blocks in the header information (operation S30).

The intra prediction unit 140 generates a predicted value of a pixel of the current block using a pixel value of a neighboring block that has already been decoded in a current frame based on the first data information about the current block (operation S40).

The inter prediction unit 150 predicts a reference block in a reference frame that has already been decoded based on the second data information about the current block and generates a predicted value of a pixel of the current block based on a converted pixel value of the reference block (operation S50). At this time, the parsing unit 110 outputs the first data information and the second data information to the intra prediction unit 140 and the inter prediction unit 150, respectively, based on the information about each block, so that operations S30 through S50 are performed.

The adder 160 adds a residual value restored based on the third data information to the predicted pixel value of the current block generated by either the intra prediction unit 140 or the inter prediction unit 150, to generate a decoded stream (operation S60). Operation S50 may include operations S51, S53, S55, S57, and S59 as illustrated in FIG. 6.

The motion compensator 151 receives a motion vector extracted from the bit stream BS by the parsing unit 110 (operation S51) and predicts the reference block based on the motion vector of the current block (operation S53). The bit converter 153 receives the pixel value of the reference block from the memory access unit 180 (operation S55) and converts the pixel value of the reference block to a value having as many bits as the pixel value of the current block (operation S57). At this time, the bit converter 153 changes the number of bits based on a predetermined matrix using the medium values or random values of binary numbers having as many digits as the difference between the number of bits of a reference pixel and the number of bits of a current pixel.

Thereafter, the motion compensator 151 generates the predicted value of the pixel of the current block based on the converted pixel value of the reference block (operation S59).

Figure 7:
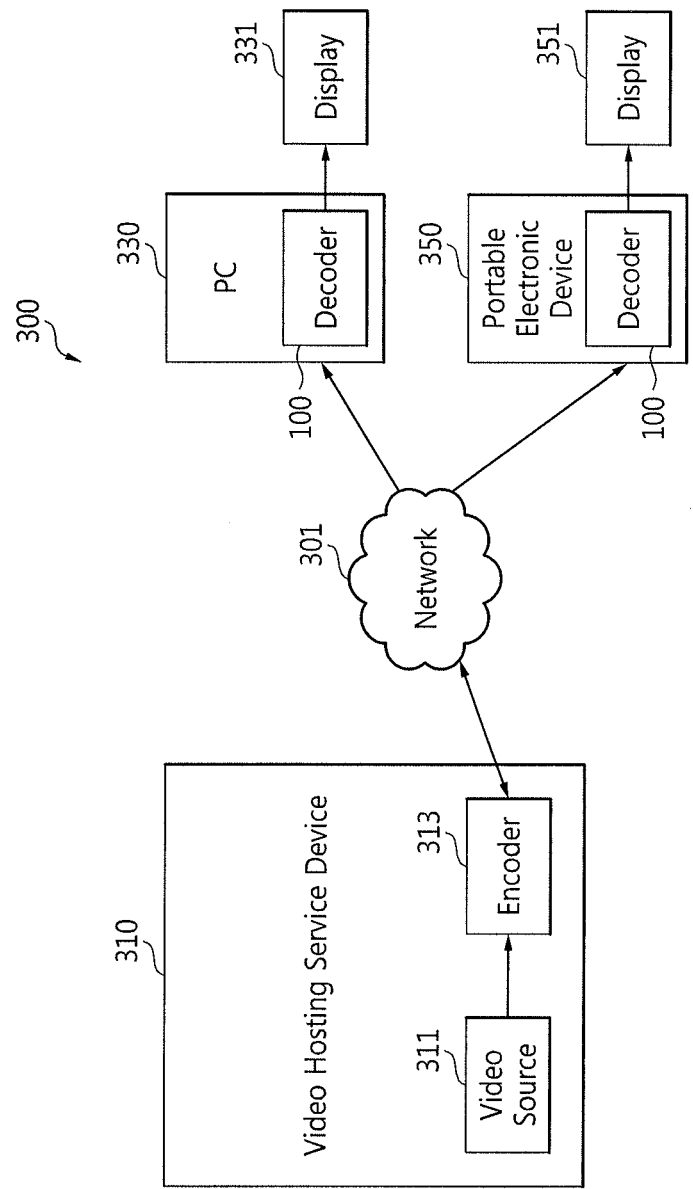
FIG. 7 illustrates an embodiment of a system including a decoder.

FIG. 7 illustrates an embodiment of a system 300 which includes the decoder 100 in FIG. 1. Referring to FIGS. 1 through 7, the image processing system 300 includes a video hosting service device 310, a first device 330, and a second device 350.

The first device 330 may be implemented, for example, as a personal computer (PC) and the second device 350 may be implemented as a portable electronic device. The devices 310, 330, and 350 may communicate with one another through a network 301. The architecture of the network 301 may be different in various embodiments. For example, the network 301 may be or include a wired internet, a wireless internet, or a mobile communication network.

The video hosting service device 310 includes a video source 311 and an encoder 313. The encoder 313 receives an original image from the video source 311. The encoder 313 encodes the original image and generates an encoded bit stream. The encoded bit stream is transmitted to the first device 330 and/or the second device 350 through the network 301.

Each of the devices 330 and 350 may be, for example, a PC, a cellular phone, a smart phone, a tablet PC, a laptop computer, a personal digital assistant (PDA), an enterprise digital assistant (EDA), a portable multimedia player (PMP), a personal navigation device or portable navigation device (PND), a handheld game console, a mobile internet device (MID), or an e-book.

The first device 330 includes the decoder 100 and a display 331. The second device 350 includes the decoder 100 and a display 351. The decoder 100 is the decoder 100 in FIG. 1. Each decoder 100 receives the encoded bit stream from the network 301, decodes the encoded bit stream, and outputs a decoded image to a corresponding one of the displays 331 and 351.

Figure 8:
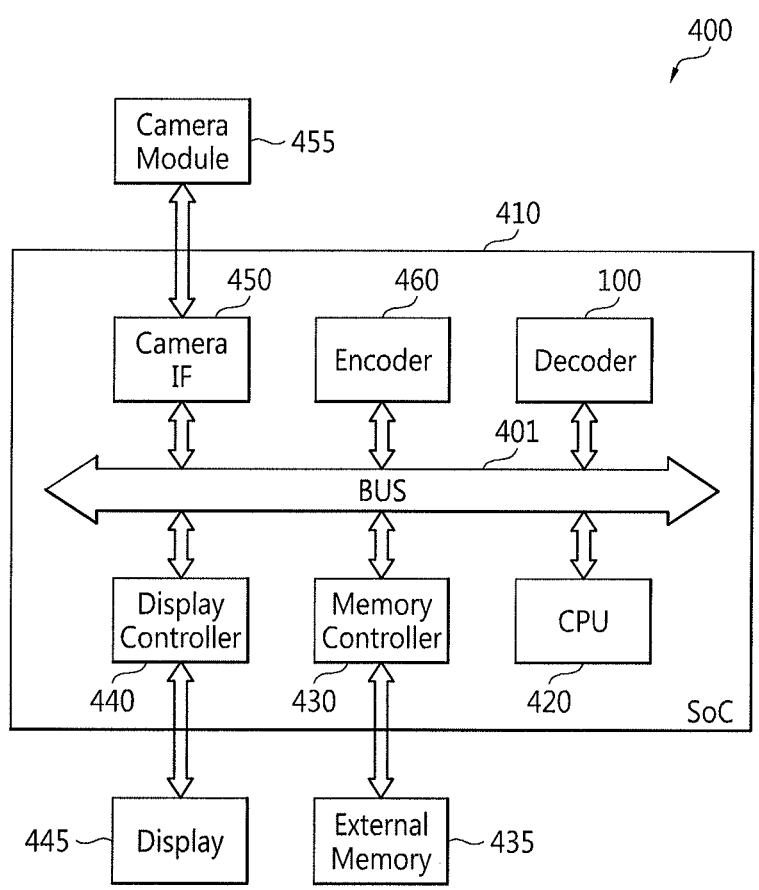
FIG. 8 illustrates another embodiment of a system including a decoder.

FIG. 8 illustrates another embodiment of a system 400 including the decoder 100 in FIG. 1. The system 400 may be implemented, for example, as a portable device such as a cellular phone, a smart phone, a tablet PC, a laptop computer, a PDA, an EDA, a digital still camera, a digital video camera, a PMP, a PND, a handheld game console, a MID, or an e-book. The system 400 includes a system on chip (SoC) 410 and an external memory 435. The system 400 may also include a display 445 or a camera module 455.

The SoC 410 controls the operation of the external memory 435, the display 445, or the camera module 455. The SoC 410 may be, for example, an integrated circuit (IC), a processor, an application processor, a multimedia processor, or an integrated multimedia processor. The SoC 410 includes a central processing unit (CPU) 420, a memory controller 430, a display controller 440, a camera interface (IF) 450, an encoder 460, and the decoder 100. The components 100, 420, 430, 440, 450, and 460 may communicate with one another through a bus 401. The architecture of the bus 401 may vary with embodiments.

The CPU 420 reads and executes program instructions to control the components 100, 430, 440, 450, and 460. The memory controller 430 may transmit an encoded bit stream from the encoder 460 to the external memory 435 and may transmit an encoded bit stream from the external memory 435 to the decoder 100.

The external memory 435 may be volatile or non-volatile memory. The volatile memory may be dynamic random access memory (DRAM), static RAM (SRAM), thyristor RAM (TRAM), zero capacitor RAM (Z-RAM), or twin transistor RAM (TTRAM). The non-volatile memory may be electrically erasable programmable read-only memory (EEPROM), flash memory, magnetic RAM (MRAM), phase-change RAM (PRAM), or resistive memory.

The display controller 440 controls the display 445 to display video data that has been decoded by the decoder 100. The display 445 may be a liquid crystal display (LCD), a light emitting diode (LED) display, an organic LED (OLED) display, an active-matrix OLED (AMOLED) display, or a flexible display.

The camera module 455 is a module that converts an optical image to an electrical image. An electrical image output from the camera module 455 may have an RGB pixel format or a YUV pixel format. The electrical image may be video source data. The electrical image is transmitted to the encoder 460 through the camera IF 450.

The decoder 100 decodes an encoded bit stream to generate video data and outputs the video data to the display 445, so that the video data is displayed on the display 445. The decoder 100 is the decoder 100 in FIG. 1.

Figure 9:
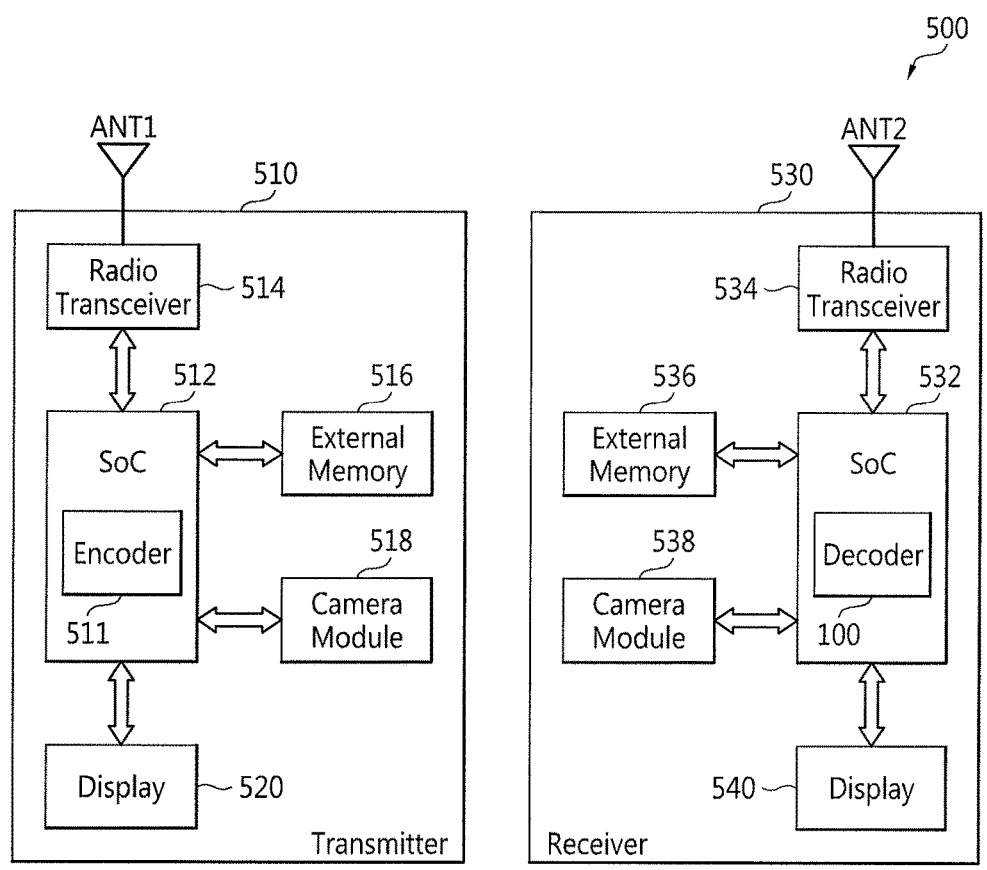
FIG. 9 illustrates another embodiment of a system including a decoder.

FIG. 9 illustrates another embodiment of a system 500 including the decoder 100 in FIG. 1. Referring to FIGS. 1 and 9, the system 500 includes a transmitter 510 and a receiver 530. Each of the transmitter 510 and the receiver 530 may be, for example, a cellular phone, a smart phone, or a tablet PC.

The transmitter 510 includes a SoC 512, a display 520, a camera module 518, an external memory 516, and a radio transceiver 514. The operations and functions of the SoC 512, the display 520, the camera module 518, and the external memory 516 are similar to those of the SoC 410, the display 445, the camera module 455, and the external memory 435 in FIG. 8.

The SoC 512 includes an encoder 511. The radio transceiver 514 may transmit an encoded bit stream to the receiver 530 through an antenna ANT1. The transmitter 510 may also operate as a receiver.

The receiver 530 includes a SoC 532, a display 540, a camera module 538, an external memory 536, and a radio transceiver 534. The operations and functions of the SoC 532, the display 540, the camera module 538, and the external memory 536 are similar to those of the SoC 410, the display 445, the camera module 455, and the external memory 435 in FIG. 8.

The SoC 532 may include the decoder 100 in FIG. 1. The radio transceiver 534 may receive an encoded bit stream from the transmitter 510 through an antenna ANT2. The receiver 530 may also operate as a transmitter.

The decoder 100 decodes an encoded bit stream to generate decoded video data and outputs the decoded video data to the display 540, so that the video data is displayed on the display 540.

In accordance with another embodiment, computer readable codes are stored on a computer readable recording medium. The computer readable code may implement the operations of the aforementioned embodiments. The computer readable recording medium is any data storage device that stores data and which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

Moreover, the methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

The converter, compensator, parsing unit, inverse quantization unit, transformation unit, intra prediction unit, and other processing and control features described herein may be implemented in logic which, for example, may include hardware, software, or both. When implemented at least partially in hardware, the converter, compensator, parsing unit, inverse quantization unit, transformation unit, intra prediction unit, and other processing and control features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the converter, compensator, parsing unit, inverse quantization unit, transformation unit, intra prediction unit, and other processing and control features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

By way of summation and review, video signal transmission usually involves performing a number of operations. For example, raw data may be compressed and encoded before being streamed to a receiver. In order to play the encoded data, the receiver decodes the encoded data. When the encoded data is at least nine bits in length and the receiver decodes the encoded data using an 8-bit reference frame, picture quality of the video signal may deteriorate as a result of bit errors.

In accordance with one or more embodiments, error is reduced or minimized when additional number of (e.g., two) bits are added to an input (e.g., 8-bit) data to allow a (e.g., 8-bit) reference frame from a memory buffer to be used for decoding a current frame of a different number of bits, e.g., at least 9-bits.

As described above, according to some embodiments of the inventive concept, a decoder efficiently converts a bit value of a reference frame, thereby minimizing error occurrence. As a result, improvement is made to the quality of pictures.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the invention as set forth in the following claims.

What is claimed is:

1. A decoder, comprising:
   a processor; and
   a memory electrically connected with the processor, the memory storing instructions, when executed by the processor, causes the processor to serve as
   a parser to parse a bit stream to extract header information and first, second, and third data information, to determine a prediction mode for a plurality of blocks in a current frame based on the header information, and to selectively output the first data information and the second data information according to the prediction mode;
   an intra predictor to generate a predicted value of a pixel of a current block based on a pixel value of a first reference block in the current frame based on the first data information;
   and an inter predictor to predict a second reference block from a reference frame based on the second data information, to convert a pixel value of the second reference block from a first number of bits to a second number of bits different from the first number of bits, and to generate a predicted value of the pixel of the current block based on a converted pixel value, wherein the inter predictor is to calculate a pixel value having a third number of bits using a predetermined matrix, the third number of bits corresponding to a difference between the first number of bits of the pixel value of the second reference block and the second number of bits of the pixel value of the current block, and add the pixel value having the third number of bits to a least significant bit of the pixel value of the second reference block to generate the second reference block having the converted pixel value for generating the predicted value of the pixel of the current block, and wherein the inter predictor includes:
   a bit converter to convert the pixel value of the second reference block to the converted pixel value of the second number of bits, the second number of bits having a same number of bits as a pixel value of the current block, wherein
   when elements of the matrix are medium values, the bit converter is to calculate the pixel value of the third number of bits using a 2×2 matrix corresponding to a combination of the medium values, and
   when elements of the matrix are random values of binary numbers having a number of digits corresponding to the third number of bits, the bit converter is to calculate the pixel value of the third number of bits using the 2×2 or an n×n matrix, where "n" is an integer of at least 3, corresponding to a combination of the random values.

2. The decoder as claimed in claim 1, wherein the inter predictor includes:
   a motion compensator to generate the predicted value based on the converted pixel value.

3. The decoder as claimed in claim 2, further comprising:
   an adder to add a residual value restored by converting a predetermined value included in the third data information and the predicted value output from either the intra predictor or the inter predictor and to output a decoded stream; and
   memory access logic to output only data to be displayed among data corresponding to the decoded stream.

4. The decoder as claimed in claim 3, wherein the memory access logic is to remove least significant bits from a number of bits corresponding to the decoded stream, except for a number of bits to be displayed by a display device.

5. The decoder as claimed in claim 1, wherein:
   the predetermined matrix is the 2×2 matrix, and
   elements of the matrix are medium values or random values of binary numbers having a number of digits corresponding to the third number of bits.

6. The decoder as claimed in claim 5, wherein:
   the bit converter is to calculate the pixel value of the third number of bits using the 2×2 matrix corresponding to a combination of the medium values or a combination of the random values,
   elements in a first row of the matrix are to be alternately added to a least significant bit of each of pixels in each of odd-numbered lines of the reference block, and
   elements in a second row of the matrix are to be alternately added to a least significant bit of each of pixels in each of even-numbered lines of the reference block.

7. The decoder as claimed in claim 1, wherein:
   the predetermined matrix is the n×n matrix, and
   elements of the matrix are random values of binary numbers having a number of digits corresponding to the third number of bits.

8. The decoder as claimed in claim 7, wherein:
   the bit converter is to calculate the pixel value of the third number of bits using the n×n matrix corresponding to a combination of the random values, and
   elements in first through n-th rows of the matrix are to be alternately added to a least significant bit of each of pixels in each of lines of the reference block.

9. A method of operating a decoder, the method comprising:
   parsing a bit stream to extract header information, first data information, and second data information;
   selectively outputting the first data information and the second data information according to a prediction mode determined for each of a plurality of blocks in a current frame based on the header information;
   generating a predicted value of a pixel of a current block using a pixel value of a first reference block in the current frame based on the first data information;
   predicting a second reference block from a reference frame based on the second data information and converting a pixel value of the second reference block from a first number of bits to a second number of bits different from the first number of bits to generate a converted pixel value, the second number of bits having a same number of bits as a pixel value of the current block;

generating a predicted value of the pixel of the current block based on the converted pixel value;

calculating a pixel value having a third number of bits using a predetermined matrix, the third number of bits corresponding to a difference between the first number of bits of the pixel value of the second reference block and the second number of bits of the pixel value of the current block; and adding the pixel value having the third number of bits to a least significant bit of the pixel value of the second reference block to generate the second reference block having the converted pixel value for generating the predicted value of the pixel of the current block, wherein when elements of the matrix are medium values, the pixel value of the third number of bits is calculated using a 2×2 matrix corresponding to a combination of the medium values, and when elements of the matrix are random values of binary numbers having a number of digits corresponding to the third number of bits, the pixel value of the third number of bits is calculated using the 2×2 or an n×n matrix, where "n" is an integer of at least 3, corresponding to a combination of the random values.

10. The method as claimed in claim 9, wherein the pixel value of the second reference block has fewer bits than the pixel value of the current block.

11. The method as claimed in claim 9, wherein calculating the pixel value of the third number of bits using the 2×2 matrix includes:
alternately adding elements in a first row of the matrix are to a least significant bit of each of pixels in each of odd-numbered lines of the reference block, and
alternately adding elements in a second row of the matrix are to a least significant bit of each of pixels in each of even-numbered lines of the reference block.

12. The method as claimed in claim 9, wherein calculating the pixel value of the third number of bits using the n×n matrix includes alternately adding elements in first through n-th rows of the matrix are to a least significant bit of each of pixels in each of lines of the reference block.

13. A decoding system, comprising:
a decoder to decode a bit stream and output a decoded stream;
and a memory buffer to receive the decoded stream and store the decoded stream as a reference frame, wherein the decoder includes:
a processor; and
a memory electrically connected with the processor, the memory storing instructions, when executed by the processor, causes the processor to serve as
a parser to parse the bit stream to extract header information, first data information, and second data information, to determine a prediction mode for a plurality of blocks in a current frame based on the header information, and to selectively output the first data information and the second data information according to the prediction mode;
an intra predictor to generate a predicted value of a pixel of a current block using a pixel value of a first reference block in the current frame based on the first data information;

and an inter predictor to predict a second reference block from a reference frame based on the second data information, to convert a pixel value of the second reference block from a first number of bits to a second number of bits different from the first number of bits, and to generate a predicted value of the pixel of the current block based on a converted pixel value, wherein the inter predictor is to calculate a pixel value having a third number of bits using a predetermined matrix, the third number of bits corresponding to a difference between the first number of bits of the pixel value of the second reference block and the second number of bits of the pixel value of the current block, and add the pixel value having the third number of bits to a least significant bit of the pixel value of the second reference block to generate the converted pixel value for generating the predicted value of the pixel of the current block, and wherein the inter predictor includes:
a bit converter to convert the pixel value of the second reference block to the converted pixel value of the second number of bits, the second number of bits having a same number of bits as the pixel value of the current block, wherein when elements of the matrix are medium values, the bit converter is to calculate the pixel value of the third number of bits using a 2×2 matrix corresponding to a combination of the medium values, and when elements of the matrix are random values of binary numbers having a number of digits corresponding to the third number of bits, the bit converter is to calculate the pixel value of the third number of bits using the 2×2 or an n×n matrix, where "n" is an integer of at least 3, corresponding to a combination of the random values.

14. The system as claimed in claim 13, wherein the inter predictor includes:
a motion compensator to generate the predicted value based on the converted pixel value.

15. The system as claimed in claim 13, wherein the system is implemented in a system on chip.

16. The system as claimed in claim 13, wherein the system is implemented in an application processor.

17. The system as claimed in claim 13, wherein:
the bit converter is to calculate the pixel value of the third number of bits using the 2×2 matrix corresponding to a combination of the medium values or a combination of the random values,
elements in a first row of the matrix are to be alternately added to a least significant bit of each of pixels in each of odd-numbered lines of the reference block, and
elements in a second row of the matrix are to be alternately added to a least significant bit of each of pixels in each of even-numbered lines of the reference block.

18. The system as claimed in claim 13, wherein:
the bit converter is to calculate the pixel value of the third number of bits using the n×n matrix corresponding to a combination of the random values, and
elements in first through n-th rows of the matrix are to be alternately added to a least significant bit of each of pixels in each of lines of the reference block.

* * * * *